March 28, 1961 L. L. WOLMAN 2,977,582
ANALOG-DIGITAL CONVERTER
Filed Nov. 19, 1956 3 Sheets-Sheet 1

INVENTOR
LANE L. WOLMAN
BY *Ellsworth R. Roston*
ATTORNEY

March 28, 1961 L. L. WOLMAN 2,977,582

ANALOG-DIGITAL CONVERTER

Filed Nov. 19, 1956

3 Sheets-Sheet 2

INVENTOR
LANE L. WOLMAN

BY Ellsworth R. Roston

ATTORNEY

March 28, 1961

L. L. WOLMAN 2,977,582

ANALOG-DIGITAL CONVERTER

Filed Nov. 19, 1956

3 Sheets-Sheet 3

INVENTOR
LANE L. WOLMAN

BY Ellsworth R. Roston

ATTORNEY 2,977,582

ANALOG-DIGITAL CONVERTER

Lane L. Wolman, North Hollywood, Calif., assignor to General Precision, Inc., a corporation of Delaware Filed Nov. 19, 1956, Ser. No. 623,197

18 Claims. (Cl. 340—347)

The present invention is directed to analogue-to-digital converters. Specifically, the invention is concerned with converters for producing a plurality of signals representing in digital form the value of an analogue quantity such as the instantaneous position of a movable member.

Digital computers are presently recognized for their high accuracy, especially in comparison to computers of the analogue type. However, values represented in analogue form must be converted into digital form before computations are made involving such quantities. Apparatus commonly designated as an analogue-to-digital converter is presently known for making this conversion.

Difficulties have been encountered in devising and constructing practicable converters of the above type. Most prior art converters have required mechanical switches and other bulky mechanical components. These requirements render such prior art converters unnecessarily large and unduly expensive. The use of these mechanical components has also impaired the accuracy of prior art units, partly because of the limitations in the speed of response of the switches. Because of this, such converters often have not been able to respond as rapidly as the computers with which they are associated. This has tended to limit the speed at which the computers operate.

The previous converters generally include a rotatable disc made from insulating material with a series of electrically conductive segments concentrically positioned on one or both of its surfaces. These segments are arranged in rows of different ordinal significance which increases from the rim to the center of the disc. The converter also includes a plurality of electrically conductive resilient brushes which selectively contact the conductive segments in each of the rows. The analogus quantity represented by the angular position of the disc at any instant is converted to a multidigital number corresponding to that quantity by the selective engagement of the respective brushes with the conductive segments in the various rows.

One of the problems in the prior art converters results from ambiguities and false readings. The ambiguities arise from mechanical tolerances, which cause a particular brush to engage a conductive segment in its corresponding row when it should be engaging a non-conductive portion of the disc. Similarly, ambiguities also arise when a brush does not engage a conductive segment at the time that it should be engaging a conductive segment.

The ambiguities described in the previous paragraph are eliminated in a converter described and claimed in co-pending application Serial Number 467,154 filed November 5, 1954, by Leo P. Retzinger, Jr. This involves the use of two displaced brushes for each concentric row of the segments except the row of least significance. The engagement of the brushes in any particular row with corresponding conductive segments in that row determines which of the two brushes of the next succeeding row is to be selected. The physical positioning of the brushes is such that the selected brush in any row is positively and completely on its proper segment at the time of a brush selection and is not passing over the edge of that segment. This use of paired brushes in the various rows has been found to resolve the ambiguities that would arise if a single brush were used for each row.

The co-pending Retzinger application utilizes an extraneous switching circuit for selecting the brushes of each row on the disc. This circuit is so arranged that the digital information from the disc is fed successively to the output terminals of the system over a single path. Therefore, although the system is accurate and efficient in its operation, the use of a single path between the information disc and the output terminals and the sequential feed of the digital information in successive rows over this path limit somewhat the optimum possible speed with which analogue quantities may be converted to multi-digital numbers. This limitation does not exist in relation to prior art converters but it does exist in relation to a converter which would operate on a truly parallel basis. That is, speed of conversion may be increased when all of the digits of the multi-digital number are developed simultaneously by the disc and fed simultaneously to the output terminals of the system.

Co-pending application Serial Number 587,599 filed May 28, 1956, by Wallace P. Chase discloses and claims an analogue-to-digital converter of the general type described in the Retzinger application. In the Chase system, however, the output terminals are energized essentially simultaneously through a plurality of parallel paths from the information disc rather than successively over a single path. The time required for conversion becomes considerably decreased because of the essentially parallel arrangement of the paths and because of substantially simultaneous feed of the digital information from the disc to the output terminals.

The Chase system, like the Retzinger system, uses a double brush arrangement for each row of segments on the disc (except for the row of least digital significance) to avoid ambiguities. Both of these systems use electronic switching control circuits for selecting the proper brush in each row and for feeding the converted information from the disc to the output terminals of the system.

The present invention eliminates ambiguities in the conversion of analogue quantities to a digital form by using principles which are completely original with respect to previous systems. The invention includes an information member such as a disc having a plurality of information rows. However, in each information row, there are a plurality of first conductive portions directly connected to a source of voltage, a plurality of electrically insulated portions and a plurality of second conductive portions not directly connected to the voltage source. The second conductive portions are disposed on each side of the first portions so as to lead and lag the first portions in isolated relationship to the first portions.

Only one brush is associated with each row but in certain rows second electrical brushes are included to carry the voltage from the first conductive portions in those rows to the second conductive portions in other rows. The arrangement is such that either a first portion in a row becomes directly energized by the brush in that row at certain positions of the disc or a second conductive portion becomes energized at other positions of the disc by a conductive portion in a preceding row. In this way, ambiguities in reading are eliminated without any necessity for providing a pair of brushes in each row and without any necessity for selecting one of the two brushes in each row.

The use of such isolated leading and lagging portions in the place of multiple brushes in each row results in an economical saving in brushes. Such use is also advantageous in that it eliminates the need for external switching circuits between the brushes and the output terminals of the system. This results in a truly parallel analogue-to-digital converter system for providing simultaneous readings from a plurality of rows to an information disc. That is, the brushes are directly connected to corresponding output terminals over a plurality of parallel paths such that digital information is instantly developed across the output terminals of the system. This digital information corresponds at any particular instant to the analogue quantity represented by the position of the disc or other information member at that instant.

In the drawings:

Figure 1 is a somewhat schematic diagram illustrating an information member such as a rotatable disc and also illustrating a plurality of resilient electrical brushes which are included in prior converters to selectively contact digitally allocated conductive segments on the rotatable disc;

Figure 2 is a diagram schematically illustrating certain portions of an information member such as a disc which forms one embodiment of the present invention and which includes a plurality of energized conductive segments arranged in concentric rows of different ordinal significance and which also includes auxiliary isolated conductive segments, such segments respectively leading and lagging the energized conductive segments and being controllably energized to resolve ambiguities;

The present invention will be described as embodying a rotatable insulating disc having conductive segments mounted on one of its surfaces and having a plurality of resilient brushes contacting these segments. However, it should be understood that other types of information members and related components can be used. For example, the rotatable discs can be replaced by other types of information members moving in a rectilinear path. Furthermore, the conductive segments and the insulated disc may be replaced by a transparent disc having opaque segments, the disc and segments being scanned by a light beam to constitute an equivalent of the mechanical system to be described. Alternately, the disc may be positioned within a cathode-ray beam tube. Then, by appropriate radial and annular scanning of the disc and its conductive segments by the cathode-ray beam, the desired result of the invention may be realized.

Figure 1:
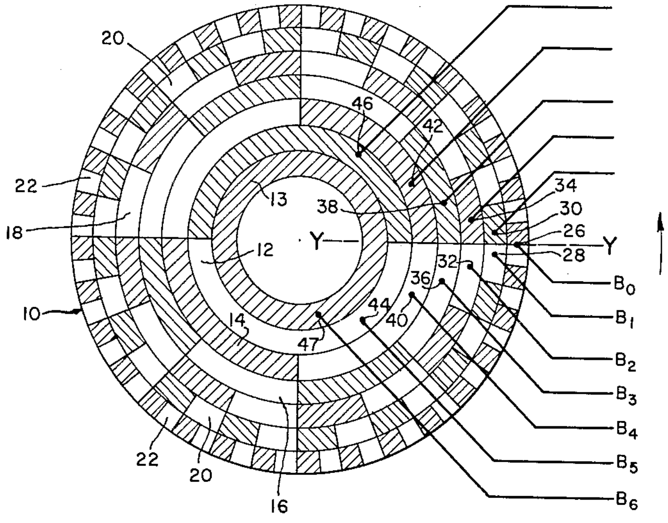

The embodiment of Figure 1 includes a disc 10 which is adapted to be mounted on a shaft for rotation about a common axis. This disc may be made from suitable insulating material and is provided with a plurality of electrically conductive arcuate segments formed on at least one of its surfaces. These electrically conductive arcuate segments are arranged on a surface of the disc 10 in a series of concentric annular rows 12, 14, 16, 18, 20 and 22. The conductive segments are shown by the shaded areas in each of these rows. As will be described, the conductive segments are arranged in a pattern representing a multi-digital binary number, with the annular rows of the disc increasing in ordinal significance from the rim of the disc toward its center. The disc also includes an annular row 13 which is entirely conductive and to which electrical contact may be made. The row 13 and all the conductive segments are interconnected, so that when the row 13 is energized all the conductive segments are also energized.

The row 12 has a conductive segment extending through an arc of substantially 180°. The row 14 has two conductive segments each extending through 90° and each separated by non-conductive segments having angular lengths of 90°. The row 16 has four conductive segments each having an angular length of approximately 45° and each being displaced from one another by non-conductive segments having angular lengths of 45°. The row 18 has eight conductive segments each having an angular length of 22½° and each being separated from one another by non-conductive segments having angular lengths of 22½°. Likewise, the row 20 has sixteen equally spaced conductive segments of an angular length of 11¼° and the row 22 has thirty-two equally spaced conductive segments with angular lengths of 5⅝°.

The leading edges of one of the conductive segments in each of the rows may be lined up along the axis Y—Y on the disc which represents the zero position. Of course, such arrangement is not necessary since the contacting brushes can be staggered in accordance with any desired staggering of the segments. However, for purposes of simplicity in describing and understanding, the conductive segments are illustrated in Figure 1 as being aligned. It is assumed that the disc is roating in a counterclockwise direction.

It will be noted that if a series of stationary conductive brushes were disposed along the axis Y—Y in respective engagement with the different rows 12, 14, 16, 18, 20 and 22 on the disc 10, then as the disc rotates in a counterclockwise direction, the conductive segments in the various rows make successive contact with these brushes in a manner to establish a binary count across the brushes.

If the rows 12, 14, 16, 18, 20 and 22 are arranged in an order of decreasing ordinal significance, then the row 22 may be considered to represent the digit $2^{\circ}$; the row 20 will represent the digit $2'$; the row 18 will represent the digit $2^2$, and so on. Therefore, the series of brushes assumed to be positioned along the line Y—Y will produce pulses corresponding to multi-digital binary numbers as the disc 10 rotates in a counterclockwise direction. At any instant, the binary number represented by the pulses across these brushes will correspond to the analogue quantity represented by the angular position of the shaft at that particular instant.

It should be evident that the number of rows of conductive segments on the disc 10 in Figure 1 is merely illustrative. More or less rows can be used depending upon the number of digits desired for the multi-digital number and the number of digits in turn determines the accuracy of the system. It should also be noted that the number of rows of conductive segments on the information discs constituting this invention are also merely illustrative, and more or less may be used.

When a single row of brushes is utilized in the manner suggested above, the system is susceptible to ambiguities, as noted previously. These ambiguities are not particularly serious in the row 22 of the least digital significance. However, if the brush associated with the row 12 of greatest digital significance made contact with a conductive segment when it should not, a substantial error would be produced. To preclude the possibility of such ambiguities, the prior art embodiment of Figure 1 uses a pair of brushes for each row of the conductive segments with the exception of the row 22 of least digital significance.

A single brush 26 is associated with the row 22. A brush 28 and a brush 30 engage the conductive and non-conductive segments of the row 20. Similarly, brushes 32 and 34 engage the conductive and non-conductive segments in the row 18. In like manner, brushes 36 and 38, brushes 40 and 42 and brushes 44 and 46 are respectively positioned to engage the conductive and non-conductive segments of the rows 16, 14 and 12. Finally, a brush 47 connected to a source of direct voltage is positioned adjacent the disc to engage the conductive row 13.

When the disc 10 is in its zero position in Figure 1, the aligned leading edges of the segments of the rows 12, 14, 16, 18, 20 and 22 extend along the axis Y—Y. For this zero position, the brush 26 is on the leading edge of a non-conductive portion of row 22; the brushes 28, 32, 36, 40 and 44 are on one side of the axis Y—Y and the brushes 30, 34, 38, 42 and 46 are on the other side of this axis.

Each of the brushes 28, 32, 36, 40 and 44 is positioned to lead the brush 26 by an angular distance substantially equal to one quarter of the length of the conductive segments in its corresponding row. Likewise, each of the brushes 30, 34, 38, 42 and 46 lags the brush 26 by an angular distance substantially equal to one quarter of the length of the conductive segments in its associated row.

As the disc 10 rotates, the conductive segments in each row assume different relationships with the brushes. The values of the binary digits represented by the row 22 at any instant is read by the brush 26, since that is the only brush associated with that row. However, the value of the digit represented by the row 20 is read by the selected one of the brushes 28 and 30. Similarly, the value of the digit represented by the row 18 is read by the selected one of the brushes 32 and 34, and the value of the digit represented by the row 16 is read by the selected one of the brushes 36 and 38. In like manner, the value of the digit represented by each of the other rows is indicated by the selected one of the brushes in that row.

To prevent false readings, the brush selected in each of the rows 12, 14, 16, 18, and 20 must be within the confines of a conductive or non-conductive segment in its corresponding row at the time it is read. That is, the selected brush must not be crossing the border between any such segments at the time the reading is made. This assures that there will be no possibility of a brush reading "0" to indicate a non-conductive segment when it should be reading "1" to indicate a conductive segment, or vice versa.

The physical relation between the various brushes may be seen from a particular example such as the brushes associated with the rows 22 and 20. When the brush 26 of the row 22 engages a particular conductive segment in that row, the lagging brush 30 in the row 20 has already become positioned in contacting relationship with a particular conductive or non-conductive segment in the latter row. The lagging brush 30 continues to contact the particular segment in the row 20 as long as the brush 26 engages the particular conductive segment in the row 22. Therefore, to assure a true indication from the row 20, the lagging brush 30 in that row is selected when the brush 26 engages a conductive segment in the row 22. This selection is proper because the lagging brush 30 is in positive engagement with the corresponding segment during this time whereas the leadin brush 28 is passing from one sement to another.

Alternately, when the brush 26 in the row 22 comes into enaement with a non-conductive segment of that row, the leading brush 28 in the row 20 is already contacting the particular conductive or non-conductive segment that is to be read for a true indication of the analogue quantity at that instant. Moreover, the leading brush remains in that segment until after the brush 26 passes to the next conductive segment of the row 22. Therefore, the leading brush 28 is selected for reading whenever the brush 26 engages a non-conductive portion of the row 22. This selection of the leading brush 28 in the row 20 is proper at this time because the lagging brush 30 in that row is passing from one segment to another when the brush 26 is passing through a non-conductive portion of the row 22.

Similarly, whenever the selected brush in each of the successive rows contacts a conductive segment in that row, the lagging brush in the next succeeding row is already in positive contact with a corresponding segment in the succeeding row and is selected. On the other hand, whenever the selected brush in any successive row comes into engagement with a non-conductive portion in that row, the leading brush in the next succeeding row is selected because it is already in positive engagement with its proper segment in the succeeding row.

The various conductive and non-conductive segments in each row of the information member or disc 10 may, therefore, be considered as a plurality of switch control means. These switch control means are digitally allocated on at least one surface of the member in a concentric series of different ordinal significance. These switch control means are adjustable as the disc 10 rotates to angular positions respective representing digital equivalents of a corresponding series of analogue quantities. The various brushes may be considered as switching means under the control of the switch control means referred to above. The switching means are arranged in steps of different ordinal significance to be engaged by respective ones of the control means. This more general designation can also apply to the information member and the contacting brushes of the embodiment of the invention which will subsequently be described.

A further examination of the information disc of Figure 1 will reveal that each conductive segment in any row has its leading edge aligned with the trailing edge of a conductive segment in each of the preceding rows of lesser ordinal significance. Moreover, each conductive segment in any row has its trailing edge aligned with the trailing edges of conductive segments in all the preceding rows of lesser ordinal significance. In accordance with the concept of the present invention, the leading and lagging edges of the conductive segments of each row are in effect extended. This assures that the conductive segment will come into engagement with its associated brush before the position is reached at which a particular reading is to be made. Likewise, this effective extension of the segments assures that the brush of any row will engage a non-conductive portion of that row before the actual reading is to be made.

The above is achieved by making each segment in the form of a central energized conductive segment and by disposing isolated conductive segments on each side of the central conductive segment. The isolated conductive segments on one side of the central conductive segments may be considered as leading segments since they are presented before the central conductive segments. Similarly, the isolated conductive segments on the other side of the central conductive segments may be considered as lagging segments since they are presented after the central conductive segments.

When the conductive segments in the disc are arranged to have isolated portions such as described above and when these isolated portions are suitably controlled, mechanical tolerances are no longer a problem. That is, physical contact by the brush in any row with its proper segment for each reading is positively assured.

Figure 2:
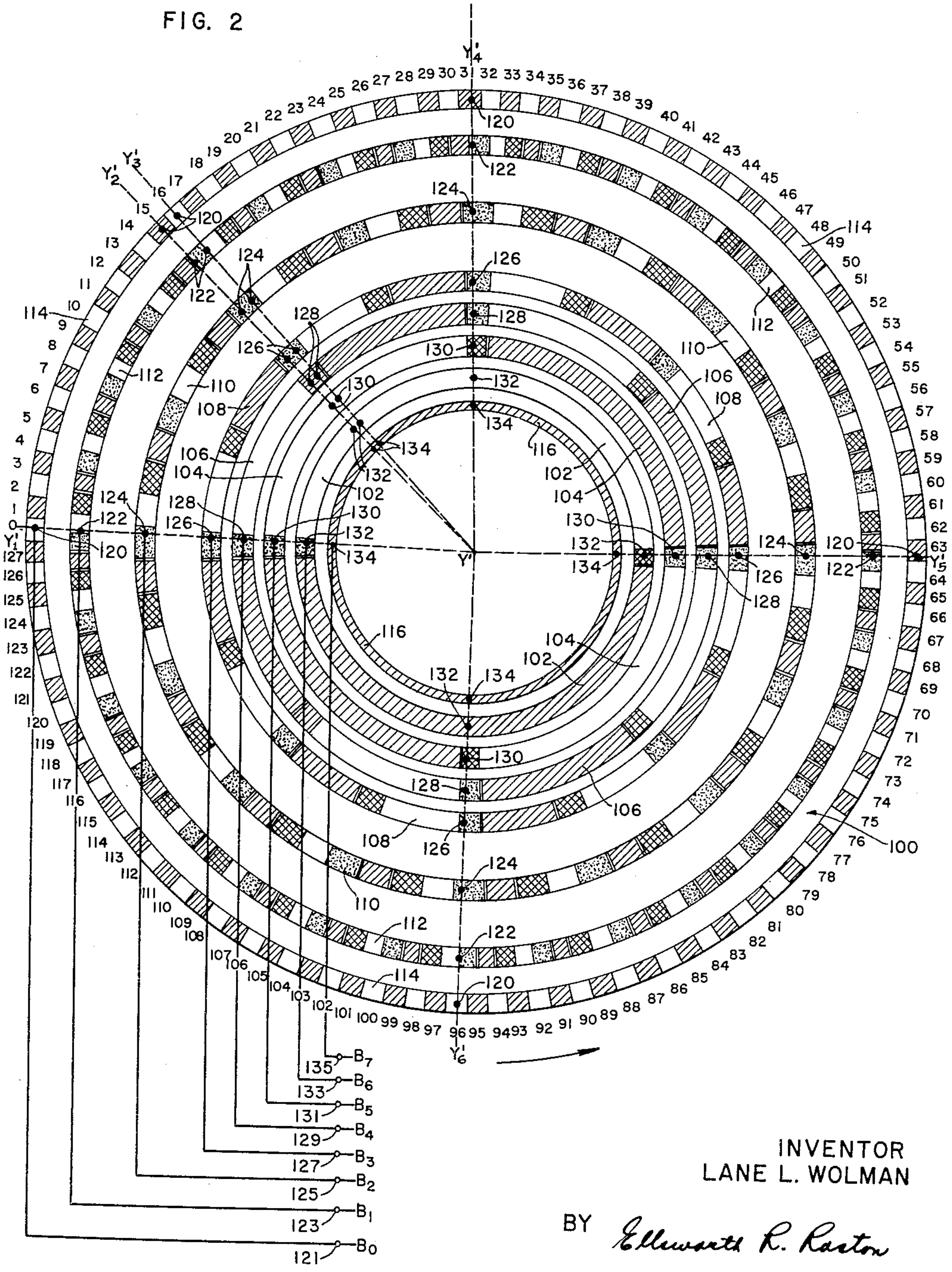

A rotatable disc 100 having electrically conductive and electrically insulated segments formed on one of its surfaces in accordance with the concept described above comprises the information member of the embodiment of Figure 2. The disc 100 is made from insulating material and, like the disc 10 of Figure 1, is adapted to be mounted on a shaft to be rotatable with the shaft about a common axis. The disc is assumed to be rotatable in a counterclockwise direction. The disc 100 is provided with a plurality of electrically conductive arcuate segments on at least one of its faces. These arcuate segments are arranged in a series of concentric annular reading rows 102, 104, 106, 108, 110, 112 and 114. The conductive segments shown by the shaded areas in each of these rows and they are arranged in a pattern representing a multi-digital binary number. The rows increase in ordinal significance, for example, from the rim of the disc 100 to the center.

The disc 100 also has an inner row 116 which is entirely conductive and to which electrical contact may be made by a suitable brush in a manner to be described. The row 116 is electrically connected to particular segments in each of the annular rows. Therefore, when the conductive row 116 is appropriately connected to a terminal of a source of energized voltage, particular segments on the disc are energized at the potential of that terminal as will be described in detail subsequently. The conductive row 116 and the segments directly connected to it may be energized with a direct voltage of positive or negative polarity and may even be energized by alternating or pulsating signals.

The conductive and non-conductive segments in each of the annular rows are arranged in a pattern generally similar to the arrangement of Figure 1, and a detailed discussion of these segments is believed unnecessary. In this embodiment, the row 114 may be considered to represent the digit $2^0$; the row 112 represents the digit $2'$; the row 110 represents the digit $2^2$, and so on.

In each instance in the embodiment of Figure 2, the conductive segments are somewhat longer than their corresponding segments in Figure 1 except for the segments in the row 114. Furthermore, each conductive segment in each of the rows has a central energized portion (indicated by single-cross-hatching) and a leading isolated conductive portion insulated from the central portion. The leading portion increases the length of the particular segment by an amount corresponding substantially to at least the width of the conductive segment in the row 114 of least ordinal significance. These leading isolated conductive segments are represented by double-cross-hatched portions in the representation of Figure 2. Likewise, each of the energized conductive segments shown in Figure 2 has a lagging isolated portion. These lagging isolated portions also have a width at least equal to the width of the conductive segments in the outer row 114, and they are represented by the dotted areas of Figure 2.

The information member of Figure 2 has a plurality of brushes 120, 122, 124, 126, 128, 130 and 132 respectively associated with the annular rows 114, 112, 110, 108, 106, 104 and 102. The member also has a brush 134 positioned to engage the conductive row 116. The brush 134 may be connected to a suitable source of energizing voltage. Only one set of brushes 120, 122, 124, 126, 128, 130 and 132 is provided, these brushes being shown in Figure 2 a plurality of times to represent different positions of the disc 100. The system includes a plurality of output terminals 121, 123, 125, 127, 129, 133 and 135 which are respectively connected to the brushes 120, 122, 124, 126, 128, 130, 132 and 134. These connections are made over independent parallel paths.

It will be noted that there is only one brush associated with each row of the disc 100. These brushes are disposed along a radial axis $Y_1'$—$Y'$ when the disc is in its zero position. Now, as the disc rotates in a counterclockwise direction, the respective brushes will successively contact the conductive segments and non-conductive portions in each row of the disc. This action will proceed in much the same manner as the contacting action of the brushes assumed to extend along the Y—Y axis of the prior art embodiment of Figure 1.

With the exception of the conductive segments in the row 114 of least ordinal significance, each energized segment in the embodiment of Figure 2 is somewhat shorter than the corresponding conductive segment in Figure 1. As previously described, each of these energized segments is indicated in Figure 2 by single cross-hatching. However, the isolated conductive segments at the leading and trailing edge of each such energized segment increases its effective length. Therefore, as the disc 100 rotates, the brushes in the rows 102, 104, 106, 108, 110 and 112 will contact leading isolated segments associated with respective energized segments prior to the time that a reading is to be made. This takes care of the need for close mechanical tolerances.

Under the control of the brush 120 associated with the least significant row 114, the leading isolated segments are energized at the time that the brush 120 starts to engage a non-conductive segment in the row 114. Since the brushes in the rows of higher ordinal significance than the row 114 are already in contact with their respective leading isolated segments when this transition occurs, the possibility of ambiguities due to mechanical tolerances is overcome. Only the leading isolated conductive segments and not the lagging isolated conductive segments are energized at the time that the brush 120 starts to engage a non-conductive segment. The particular manner of energizing the leading isolated segments will be described in detail subsequently.

Likewise, at certain times the brushes 120 may start to engage conductive segments in the row 114. At such times, some of the brushes in the rows having higher digital significance than the row 114 may already be in contact with lagging segments in their associated rows, such lagging segments being shaded by dotted shading. These lagging segments become energized and the leading isolated conductive segments become de-energized when the brush 120 starts to engage a conductive segment in the row 114.

The above explanation may perhaps be further clarified by considering certain specific cases. For purposes of convenience, the disc of Figure 2 will be considered stationary and the row of brushes along the axis $Y_1'$—$Y'$ will be considered as rotating in a clockwise direction although actually the disc preferably rotates and the brushes remain stationary. In the initial position in which the brushes 120, 122, 124, 126, 128 and 130 extend along the axis $Y_1'$—$Y'$ for a zero setting of the disc, it will be noted that the brush 120 contacts a nonconductive portion of the row 114 and that the brushes 122, 124, 126, 128, 130 and 132 contact lagging isolated segments in their associated rows 114, 112, 110, 108, 106, 104 and 102. These lagging segments are indicated by the dotted areas in Figure 2. As previously stated, these lagging segments are energized only when the brush 120 engages a conductive segment in the row 114. Therefore, none of the brushes 122, 124, 126, 128, 130 and 132 is energized and the binary representation of zero appears across the output terminals 121, 123, 125, 127, 129, 131 and 133.

Now, consider the brushes as having been rotated to a position $Y_2'$—$Y'$ which corresponds to the decimal value "15." In this position, it will be noted that the brush 120 of row 114 is in engagement with a conductive energized segment in that row. It will also be noted that the brushes 122, 124 and 126 associated with the rows 112, 110 and 108 contact lagging isolated segments represented by dotted shading or contact directly energized segments represented by single cross-hatching. Furthermore, the brush 128 associated with the row 106 is in contact with a leading isolated segment. It may also be seen that the brushes 130 and 132 associated with the rows 104 and 102 are in engagement with non-conductive portions of these rows. Since the brush 120 in the row 114 is contacting a conductive segment, the lagging conductive isolated segments in the rows 112, 110 and 108 become energized, but the leading segment in the row 106 is not energized. This means that the brushes 120, 122, 124 and 126 of the rows 114, 112, 110 and 108 are energized, which is the proper binary digital representation for the decimal value "15."

Consider now a shift of the brushes to the decimal value "16." This is indicated by the radial line $Y_3'$—$Y'$ in Figure 2. Actually, the only brush to pass from a conductive to a non-conductive segment for this latter shift is the brush 120 in the least significant row 114. At the precise instance that this occurs, the lagging segments in the rows 112, 110 and 108 become de-energized and the leading segment in the row 106 becomes energized. Therefore, only the brush 128 in the row 106 is energized for this latter condition, which is proper for the representation of the decimal value "16."

Again, consider the shift of the brushes to the axis $Y_4'$—$Y'$ which corresponds to the decimal value "31." For this position, the brush 120 of the row 114 contacts a conductive segment; the brushes 122, 124, 126 and 128 of the rows 112, 110, 108 and 106 contact lagging segments represented by dotted shading or contact directly energized segments represented by single cross-hatching, and the brush 130 of the row 104 contacts a leading segment. Under this condition, the brushes 120, 122, 124, 126 and 128 of the rows 114, 112, 110, 108 and 106 become energized. This is proper for the representation of the decimal value "31."

Next consider the position in which the brushes extend along the axis $Y'$—$Y_5'$ corresponding to the decimal value "63." In this latter position, the brush 120 associated with the row 114 contacts a conductive segment, and all the other brushes with the exception of the brush 132 in the row 102 engage lagging isolated segments represented by dotted shading or contact energized segments represented by single cross-hatching. Furthermore, the brush 132 of the row 102 engages a leading isolated segment. Because the brush 120 in the row 114 engages a conductive segment, all the lagging segments are energized, but the leading segment in the row 102 is not energized. Therefore, the brushes 120, 122, 124, 126, 128 and 130 associated with the rows 114, 112, 110, 108, 106 and 104 are energized to provide the proper indication for the decimal value "63."

Finally, consider the position of the brushes along the axis $Y_6'$—$Y'$ corresponding to the decimal value "96." For this latter position, the brush 120 associated with the row 114 is on a non-conductive segment; the brushes 122, 124, 126 and 128 associated with the rows 112, 110, 108 and 106 are all on lagging segments; the brush 130 associated with the row 104 is on a leading segment; and the brush 132 associated with the row 102 is on a directly energized segment represented by single cross-hatching. Therefore, only the brushes 130 and 132 associated with the rows 104 and 102 are energized for the reasons described above. This is proper for the indication of the decimal value "96."

For each of the positions of the brushes described above, the brush in any particular row except the row 114 is already in physical contact with an isolated leading or lagging segment before an indication is to be made from that row and before an energizing circuit is actually established or dis-established to that isolated segment. Furthermore, such energizing circuit is established or dis-established under the control of the brush 120 associated with the row 114 at the instant that the brush 114 starts to engage a conductive segment or a non-conductive segment. More specifically, at the instant that the brush 120 passes to a non-conductive segment, the leading isolated segments are energized. Similarly, at the instant that the brush 120 passes to a conductive segment, the lagging segments are energized.

Figures 4, 5:
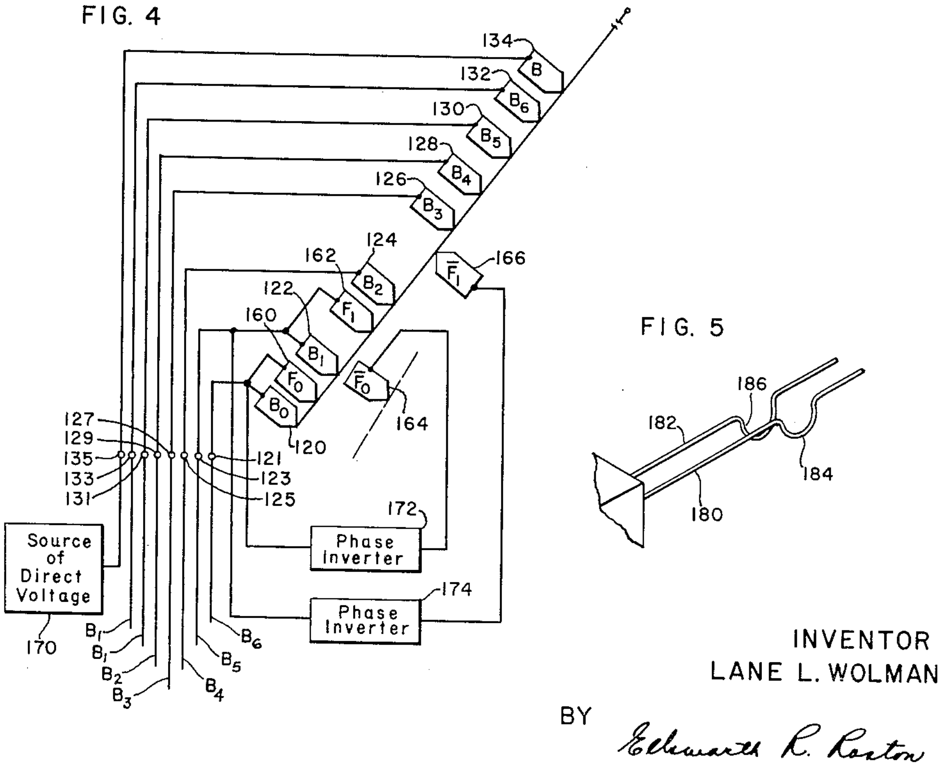
PRIOR ART FIG. 4, FIG. 5
Figure 4 is a circuit diagram showing the connections from the brushes of Figure 3 to the output terminals of the system and also showing a control circuit for a plurality of auxiliary brushes whose function will be described.
Figure 5 is a perspective view of one of the brushes to show the electrical and mechanical details of that brush.

It has been found convenient from a constructional standpoint to energize or de-energize at any particular instant only the isolated segments that are actually contacted. This minimizes jumper connections on the disc itself so that the disc can be constructed in a relatively simple manner and without any need for close tolerances. In order to minimize jumper connections on the disc itself, auxiliary brushes are disposed in contiguous relationship to the segments in particular rows and are connected to one another to energize certain of the isolated conductive segments contacted by the auxiliary and reading brushes. These auxiliary brushes are shown in Figure 4. It should be pointed out, however, that all of the required jumper connections can be physically made on the disc itself so that no auxiliary brushes would have to be used.

With the described apparatus, there is no need for infinitesimally close mechanical tolerances in the positioning of the conductive segments of the disc. For example, the isolated segments can be made sufficiently long to assure mechanical engagement between them and their corresponding brushes whenever a reading is to be made. Then, the reading is actually made under the control of the conductive and non-conductive segments in the row of least ordinal significance. This means that reading errors are reduced to zero.

The present invention requires but a single reading brush in each row of the disc 100 and auxiliary brushes in certain of the rows. The reading brushes may be directly connected to the corresponding output terminals to serve as output brushes such that digital information corresponding to the analogue quantity represented by the position of the information member appears simultaneously on these terminals. Errors due to ambiguities are reduced to zero without the need for any extraneous switching circuits. This means that the digital information developed by the information member can be simultaneously fed to the output terminals over a plurality of parallel paths. By reading out the information on a truly parallel basis, the time required to take each reading is minimized. Furthermore, since the information on the reading brushes is directly recorded, no additional electrical circuits are required. These advantages are achieved without material errors resulting from ambiguity.

Figure 3:
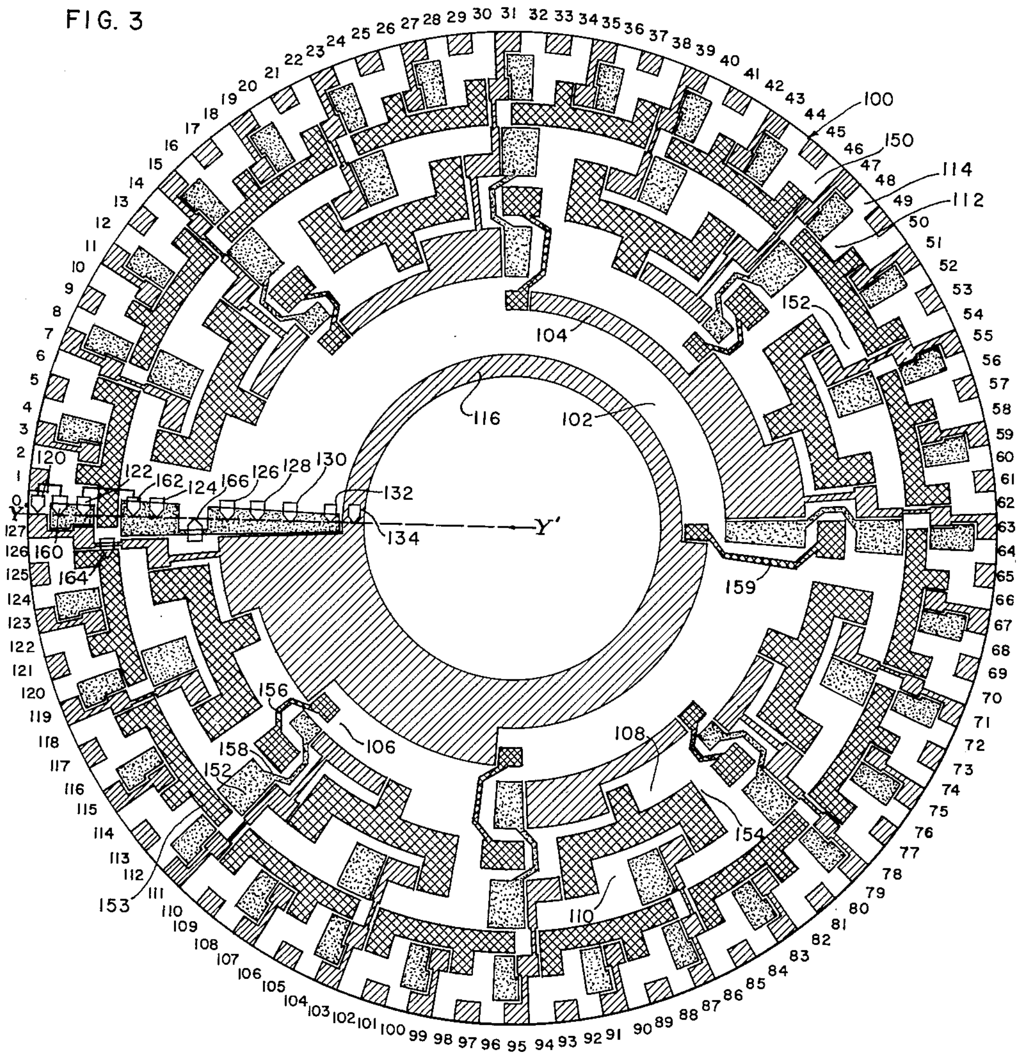
Figure 3 is a schematic diagram similar to Figure 2 and additionally shows annular rows of conductive segments interposed between the segments shown in Figure 2 and further illustrates connections between the conductive segments on the disc and also shows a plurality of resilient electrical brushes for contacting the various segments.

Figure 3 shows further details of the information member such as the disc 100 of Figure 2. Figure 3 illustrates the manner in which appropriate connections can be made to the leading and lagging isolated segments so that such segments can be energized and de-energized at the proper times. To accomplish this, annular "feed" tracks are interposed between certain ones of the various annular rows in concentric relation with each other and with the rows 102, 104, 106, 208, 110, 112 and 114. More specifically, annular feed tracks 150 and 154 are respectively interposed between the rows 114 and 112 and the rows 110 and 108. A pair of feed tracks 152 and 153 are also disposed between the rows 112 and 110.

The feed track 150 is provided with a plurality of isolated conductive portions each having an angular width corresponding to the angular width of each conductive segment in the row 114. The conductive portions in the feed track 150 are equally spaced around the track and are separated from one another by angular distances approximately three times as great as the angular width of the conductive portions. The conductive portions in the feed track 150 are integral with the lagging isolated conductive portions in the reading row 112.

The feed track 152 has isolated conductive portions with an angular length approximately twice as great as the length of the isolated conductive portions in the feed track 150. The conductive portions in the feed track 152 are symmetrically disposed relative to the conductive portions in the feed track 150 and are equally spaced from one another. However, there are only half as many conductive portions in the feed track 152 as in the feed track 150.

The number of conductive portions in the feed track 153 corresponds to the number of conductive portions in the feed track 152. Each conductive portion in the feed track 153 has a sufficient angular length so that it is separated from the adjacent portions in the track by an angular distance corresponding to the angular lengths of the conductive portions in the reading row 114. Each conductive portion in the feed track 153 is integral with an adjacent pair of leading isolated portions in the reading row 112.

The conductive portions in the feed track 154 have two different lengths. The conductive portions of the first length are alternately disposed relative to the conductive portions of the second length. The first and second conductive portions in the feed track 154 respectively have angular lengths approximately two times and five times as great as the lengths of the conductive portions in the reading row 114. The first and second conductive portions are separated from one another by distances between one and two times the length of the conductive portions in the row 114. Each of the second conductive portions in the feed track 154 is integral with an adjacent pair of leading isolated conductive portions in the reading row 110 and with a leading isolated conductive portion in the reading row 108.

Jumpers 156 extend between the leading isolated segments in the reading row 106 and alternate conductive portions of short length in the feed track 154 so as to couple these conductive portions electrically. The jumpers electrically bridge the adjacent conductive portions in the row 106 and the feed track 154 without touching any other conductive portions. In like manner, jumpers 158 electrically couple the lagging isolated conductive segments in the reading row 108 and the lagging isolated conductive segments in the reading row 110 without engaging any other segments. Jumpers 159 also extend from the leading isolated portions in the reading row 102 to the other isolated conductive segments of short length in the feed track 154. The jumpers 156, 158 and 159 are disposed on the disc at the proper positions for preventing errors from being introduced when they are contacted by the brushes in the associated rows.

An auxiliary brush 160 (Figures 3 and 4) is interposed between the brushes 120 and 122 and is aligned with these brushes. The brush 160 is disposed to successively engage the electrically conductive segments in the feed track 150 as the disc 100 rotates. The brush 160 is electrically connected to the brush 120. Likewise, a brush 162 is electrically connected to the brush 122 and is interposed between the brushes 122 and 124 in aligned relationship with these brushes. The brush 162 is disposed to successively engage electrically conductive segments in the feed track 152 as the disc 100 rotates.

A brush 164 is angularly displaced in the direction of rotation from the position of the reading brushes such as the brushes 120, 122 and 124 by an amount corresponding to the angular distance between the leading edges of successive conductive segments in the row 114. The brush 164 successively engages conductive segments in the feed track 153 as the disc 100 rotates. As will be described subsequently, the brush 164 is energized upon an engagement of the brush 120 with a nonconductive portion of the row 114 and is de-energized upon an engagement of the brush 120 with a conductive segment in that row.

A brush 166 is axially aligned with the reading brushes such as the brushes 120, 122 and 124. The brush 166 successively engages electrically conductive segments in the feed track 154 as the disc rotates. The arrangement of the brush 166 and the conductive portions in the feed track 154 is such that the brush is adapted to become energized whenever the brush 122 engages a nonconductive portion in its row 112. The brush 166 is adapted to become de-energized whenever the brush 122 engages a conductive segment in its row.

As previously described, the conductive segment in the feed tracks 150, 152, 153 and 154 are connected by jumpers 156, 158 and 159 to particular leading and lagging isolated conductive segments in the reading rows. In this way, certain of the auxiliary brushes become energized by the reading brushes because of the electrical connections between these brushes. The energized auxiliary brushes in turn energize the isolated conductive portions disposed in the feed tracks 150, 152, 153 and 154 in contacting relationship with the brushes.

Since the energized segments in the feed tracks extend into adjacent reading rows such as the row 112, the reading brushes contacting these adjacent reading rows become energized. In this way, particular lagging isolated segments in the reading rows other than the row 114 become energized to obtain the proper output signals whenever the brush 120 engages a conductive segment in the row 114. Similarly, leading isolated segments become energized through the auxiliary brushes 160, 162, 164 and 166 and the feed tracks 150, 152, 153 and 154 whenever the brush 120 is engaging a nonconductive segment in the row 114. By energizing particular leading segments in this manner, the reading brushes 120, 122, 124, 126, 128, 130 and 132 produce a plurality of signals providing a proper representation of an analogue quantity in digital form.

The appropriate connections to the brushes of Figure 3 are shown in Figure 4. As shown in that figure, the brushes 120, 122, 124, 126, 128, 130, 132 and 134 are respectively connected to their corresponding output terminals 121, 123, 125, 127, 129, 131, 133 and 135. These connections are made directly over a plurality of individual parallel paths so that the digital information derived from the brushes may be simultaneously supplied to the output terminals. The output terminal 135 is connected to the brush 134 and to the positive terminal of an appropriate source 170 of direct voltage.

The auxiliary brush 160 is directly connected to the brush 120 as previously noted, and the auxiliary brush 162 is directly connected to the brush 122. The reading brush 120 is connected to a phase inverter 172 which, in turn, is connected to the auxiliary brush 164. Likewise, the reading brush 122 is connected to a phase inverter 174 which is connected to the brush 166. The phase inverter 174 is provided so that the appropriate leading isolated segments represented by double cross hatching in the various reading rows will become energized whenever the brush 120 is engaging a nonconductive segment in the row 114.

In this manner, when the brush 120 engages a conductive segment in the row 114, the brush 164 is in effect de-energized, and when the brush 120 engages a non-conductive portion of the row 114, the brush 164 is effectively energized. Likewise, the phase inverter 174 causes the brush 166 to be effectively energized when the brush 122 engages a non-conductive portion of the row 112, and it causes the brush 160 to be effectively de-energized when the brush 122 engages a conductive segment in that row.

When any of the brushes 122, 124, 126, 128, 130 or 132 passes from one of the leading isolated segments in its associated row to an energized segment or from the energized segment to one of the lagging isolated segments, electrical contact should be maintained for optimum operation. Otherwise, the brushes might provide readings which would vary instantaneously from a correct value to an incorrect value and back to the correct value as the brushes contacted the gaps between the energized and isolated conductive segments. If the relative movement between the information member and the brushes were interrupted at a position at which the brushes engaged the gaps, an error in reading would be permanently obtained, or at least would be obtained during the time that the brushes contacted the gaps.

In order to prevent any errors in reading from being produced, the caps of electrical insulation between the energized segments and the conductive isolated segments must be made relatively narrow. However, the gaps must have a sensible and finite width if electrical isolation is to be maintained between these segments. This may conveniently be achieved by constructing the reading brushes 120, 122, 124, 126, 128, 130 and 132 in the manner shown in Figure 5. As shown in Figure 5, each reading brush is formed from at least a pair of thin conductive wires 180 and 182 which are respectively provided with downwardly hooked portions 184 and 186 at their outer ends. A pair of wires are provided in each brush to insure electrical contact with the conductive segments in the associated row in case one of the wires becomes damaged. The wires 180 and 182 are shown for purposes of clarity as being spaced in Figure 5, but actually they are preferably in contiguous relationship. The hooked portions 184 and 186 are formed so that the wires 180 and 182 contact the segments in their associated row in a diagonal line. By contacting the segments in a diagonal line, the wires in each reading brush tend to bridge the insulating gap between the directly energized segments and the isolated conductive segments in their associated row.

Only the wires in the reading brushes need have hooked portions disposed along a diagonal line since the hooked portions in the wires forming each auxiliary brush may be disposed along a line parallel to the edges of the conductive portions in the associated rows. The reason for this is that the auxiliary brushes 160, 162, 164 and 166 do not have to bridge any gaps between directly energized conductive segments and isolated conductive segments in their associated feed tracks, as do the reading brushes in their associated reading rows.

The invention provides, therefore, an improved analogue-to-digital converter which requires only a single reading brush for each row of ordinal significance and in which ambiguities are resolved in a unique manner so that the reading brushes may be directly and individually connected to a plurality of output terminals. In this way, a system is provided in which data relating to each of the digits of a multi-digital number are simultaneously produced and are fed to the output terminals for each position of the information member. This not only provides optimum conversion speed in the system but also reduces to a minimum the number of components required and eliminates any need for external electronic or mechanical switching or control circuits.

It should be appreciated that the term "conductive" in the claims is intended to cover a wide variety of different embodiments in addition to the electrical embodiment described above. For example, the term "conductive" can also be considered to include an analogue-to-digital converter operating on photoelectric principles. The term can also be considered to include a converter using an electron beam in a cathode ray tube or a converter operating on magnetic principles.

I claim:

1. In an analogue-to-digital converter, a rotatable information disc having electrically insulating properties and having a plurality of electrically conductive arcuate segments arranged on the disc in concentric rows of different ordinal significance and connected to receive an energizing potential, said disc being rotatable to different angular positions representing various analogue quantities, a first plurality of auxiliary electrically conductive arcuate segments disposed on the disc in adjacent but spaced relationship to the leading edges of said directly energized segments in said rows, a second group of auxiliary electrically conductive arcuate segments disposed on the disc in adjacent but spaced relationship to the trailing edges of said directly energized segments in said rows, a first annular feed track disposed on said disc in concentric relationship to said rows and having a plurality of isolated conductive segments connected to certain ones of the auxiliary segments in said first plurality, and a second annular feed track disposed on said disc in concentric relationship to said rows and having a plurality of isolated conductive segments connected to certain ones of said auxiliary segments in said second group.

2. The converter as set forth in claim 1, including, a plurality of electrical output brushes each disposed in contiguous relationship to a different one of said rows for selectively engaging the conductive segments in the row, a first control brush disposed in contiguous relationship to said first feed track for selectively engaging the conductive segments in the track, phase inverter means for connecting said first control brush to a first particular one of the output brushes in the plurality, and a second control brush disposed in contiguous relationship to said second feed track for selectively engaging the conductive segments in the track, said second control brush being directly connected to said one of the output brushes in the plurality.

3. The analogue-to-digital converter defined in claim 2 in which the first particular output brush is disposed in contiguous relationship to the row of least ordinal significance.

4. The analogue-to-digital converter defined in claim 2, including, a third feed track disposed on said disc in concentric relationship with said rows and having conductive segments connected to further ones of the auxiliary segments in the first plurality, a fourth feed track disposed on said disc in concentric relationship with said rows and having conductive segments connected to further ones of the auxiliary segments in the second group, a third electrical control brush disposed in contiguous relationship to said third feed track for selectively engaging the conductive segments in the track, phase inverter means for connecting said third control brush to a second particular output brush in the plurality, and a fourth electrical control brush disposed in contiguous relationship to said fourth feed track for engaging the conductive segments in the channel, said fourth control brush being directly connected to said second particular output brush in the plurality.

5. The analogue-to-digital converter defined in claim 4 in which the second particular output brush is disposed in contiguous relationship to the row of second least ordinal significance.

6. An analogue-to-digital converter, including an information member having a plurality of electrically conductive segments arranged on one side of said member in rows of different ordinal significance for the direct reception of an energizing potential, said information member being movable to different positions representing different analogue quantities, a first plurality of auxiliary electrically conductive segments disposed adjacent respective ones of said first-mentioned segments in leading relation thereto with respect to the direction of movement of said member, a second plurality of auxiliary electrically conductive segments disposed adjacent respective ones of said first-mentioned segments in trailing relation thereto with respect to the direction of movement of said member, a plurality of electrically insulating segments disposed between the first electrically conductive segments and between the first electrically conductive segments and the auxiliary conductive segments, a plurality of reading brushes each coupled electrically to a different one of said rows, means including a plurality of auxiliary brushes disposed adjacent said one side in contiguous relationship to the segments in particular rows and electrically connected to one another and to the reading brushes in a particular relationship for selectively energizing the auxiliary brushes and the auxiliary segments electrically coupled to the auxiliary brushes to obtain an energizing of certain reading brushes through the energized auxiliary brushes, and a plurality of output terminals respectively connected directly to different ones of said reading brushes to produce a plurality of signals representing in digital form the analogue quantity corresponding to the movement of the information member.

7. An analogue-to-digital converter, including an information disc of insulating material having electrically conductive arcuate segments arranged on one side of said disc and connected in concentric rows of different ordinal significance to directly receive an energizing potential, said disc being rotatable to different angular positions representing various analogue quantities, a first group of auxiliary electrically conductive arcuate segments disposed adjacent respective ones of said directly energized segments in each of said rows and in leading relation to said directly energized segments with respect to the direction of rotation of said disc, a second group of auxiliary electrically conductive arcuate segments disposed adjacent respective ones of said directly energized segments in each of said rows and in trailing relation to said directly energized segments with respect to the direction of rotation of said disc, said first and second auxiliary segments in each row being electrically insulated from said first-mentioned segments and from one another, a plurality of electrical reading brushes each disposed in contiguous relationship to a different one of said rows, a plurality of auxiliary brushes disposed adjacent said one side in contiguous relationship to the segments in particular rows and electrically coupled to one another and to particular reading brushes in the plurality to energize the auxiliary brushes in accordance with the energizing of their coupled brushes and to energize the auxiliary conductive segments disposed in contiguous relationship to the energized auxiliary brushes for energizing of particular ones of the reading brushes through the energized auxiliary segments, and a plurality of output terminals connected to the different reading brushes for the simultaneous production of output signals on the output terminals in accordance with the signals produced by the reading brushes.

8. An analogue-to-digital converter, including an information member having first electrically conductive segments arranged on one side of said member in rows of different ordinal significance and connected to receive an energizing potential, a plurality of auxiliary electrically conductive segments disposed adjacent the ends of respective ones of said directly energized segments but electrically insulated therefrom, and means including a plurality of brushes adjacent said one side and electrically coupled to the segments in the different rows and electrically connected to one another in a particular pattern to directly energize particular ones of the brushes through the first segments and to energize particular auxiliary segments through the energized brushes and to energize selective ones of the remaining brushes through the energized auxiliary segments for the simultaneous production by the brushes of pluralities of signals representing the position of the information member at different instants of time.

9. An analogue-to-digital converter, including, a rotatable information disc of insulating material having a plurality of electrically conductive arcuate segments arranged on one side of the disc in concentric rows of different ordinal significance and connected to directly receive an energizing potential, said disc being rotatable to different angular positions representing various analogue quantities, a first plurality of auxiliary electrically conductive arcuate segments disposed on the disc in adjacent but spaced relationship to the leading ends of said directly energized segments in said rows, a second group of auxiliary electrically conductive arcuate segments disposed on the disc in adjacent but spaced relationship to the trailing ends of said directly energized segments in said rows, and means including a plurality of brushes disposed adjacent said one side in contiguous relationship to the conductive segments in the different rows for coupling with said segments to simultaneously produce a plurality of signals digitally representing at any instant the angular position of the disc.

10. An analogue-to-digital converter, including an information member having a plurality of conductive and non-conductive segments alternately disposed on one side of said member in rows of different ordinal significance and connected to be directly energized, a first plurality of conductive segments electrically isolated from the directly energized segments and disposed in leading relationship to the directly energized segments in the different rows, a second plurality of conductive segments electrically isolated from the directly energized segments and disposed in lagging relationship to the directly energized segments in the different rows, a plurality of output brushes disposed in coupled relationship to the conductive and non-conductive segments in the different rows to provide signals in accordance with their disposition relative to the conductive and non-conductive segments in their associated rows at any instant, and means including a plurality of auxiliary brushes disposed adjacent said one side for energizing particular lagging conductive segments upon a coupled relationship between a particular one of the output brushes and the conductive segments in the associated row and for energizing particular leading conductive segments upon a coupled relationship between the particular output brush and the non-conductive segments in the associated row to obtain an energizing of the output brushes in accordance with the disposition of the information members.

11. An analogue-to-digital converter, including an information member having a plurality of conductive and non-conductive segments alternately disposed on the member in rows of different ordinal significance and connected to be directly energized, a first plurality of conductive segments disposed adjacent respective ones of the directly energized segments in leading relationship to the directly energized segments with respect to the direction of rotation of the information member and disposed in isolated relationship to the directly energized segments, a second plurality of conductive segments disposed adjacent respective ones of the directly energized segments in lagging relationship to the directly energized segments with respect to the direction of rotation of the information member and disposed in isolated relationship to the directly energized segments, a plurality of reading brushes disposed in contiguous relationship to the segments in the associated rows, a plurality of feed tracks having isolated conductive segments connected to particular ones of the leading and lagging isolated conductive segments in the first and second pluralities, and means including a plurality of auxiliary brushes disposed in contiguous relationship to the feed tracks and electrically coupled to one another and to the reading brushes in a particular relationship to energize selective lagging isolated conductive segments in the second plurality upon a disposition of a particular one of the reading brushes in contiguous relationship to one of the conductive segments in the associated row and to energize selective leading isolated conductive segments in the first plurality upon a disposition of the particular reading brush in contiguous relationship to one of the non-conductive segments in the associated row to obtain an energizing of the reading brushes in accordance with the disposition of the information member.

12. The converter set forth in claim 11 in which the reading brushes are disposed in a substantially linear relationship and in which the particular reading brush is disposed in contiguous relationship to the segments in the row of least ordinal significance.

13. The converter set forth in claim 11 in which the brushes each have a pair of spaced contact elements which contact the segments in their associated rows to bridge the gap between the directly energized segments and the auxiliary conductive segments in the associated rows.

14. In an analogue-to-digital converter, an information member having first conductive segments arranged on the member in rows of different ordinal significance and electrically connected to directly receive an energizing potential and a plurality of auxiliary conductive segments disposed on the information member in the different rows and adjacent respective ones of said directly energized segments but isolated therefrom to receive the energizing potential only at particular times and means disposed adjacent said conductive segments and coupled to the directly conductive segments and to the auxiliary conductive segments in a particular relationship for energizing particular ones of the auxiliary segments in accordance with the coupling to the directly conductive segments.

15. In an analogue-to-digital converter, an information member having first conductive segments arranged on the member in rows of different ordinal significance and electrically connected to directly receive an energizing potential and a plurality of auxiliary conductive segments disposed on the information member in the different rows and adjacent respective ones of said directly energized segments but isolated therefrom to receive the energizing potential only at particular times, and a second plurality of auxiliary conductive segments disposed on the information member in additional rows and in isolated relationship to the directly conductive segments and coupled electrically to one another and to the auxiliary conductive segments in the first plurality in a particular relationship to receive the energizing potential only at particular times.

16. In an analogue-to-digital converter, an information member having a plurality of alternate electrically conductive and non-conductive segments arranged on the member in rows of different ordinal significance, said conductive segments being connected to directly receive an energizing potential, a first plurality of auxiliary electrically conductive segments disposed on the information member adjacent first ends of said directly energized segments, a second plurality of auxiliary electrically conductive segments disposed on the information member adjacent the other ends of said directly energized segments, said auxiliary segments being electrically insulated from said directly energized segments, and means coupled to the directly energized segments for energizing particular ones of the auxiliary conductive segments in the first plurality upon coupling to the directly conductive segments in particular ones of the rows and for energizing particular ones of the auxiliary conductive segments in the second plurality upon coupling to non-conductive segments in the particular ones of the rows.

17. In an analogue-to-digital converter, an information member having a plurality of alternate electrically conductive and non-conductive segments arranged on the member in rows of different ordinal significance, said conductive segments being connected to directly receive an energizing potential, a first plurality of auxiliary electrically conductive segments disposed on the information member adjacent first ends of said directly energized segments, a second plurality of auxiliary electrically conductive segments disposed on the information member adjacent the other ends of said directly energized segments, said auxiliary segments being electrically insulated from said directly energized segments, and means including a plurality of isolated conductive segments disposed in separate rows different from the rows holding the directly conductive segments, the isolated segments in the last plurality being coupled to particular ones of the isolated segments in the first and second pluralities.

18. In an analogue-to-digital converter, an information member having first conductive segments arranged on the member in rows of different ordinal significance and electrically connected to directly receive an energizing potential, a plurality of auxiliary conductive segments disposed in the different rows after the row of least ordinal significance and in isolated but adjacent relationship to the directly conductive segments to become energized at particular positions of the information member, there being electrically insulated segments between each of the directly energized segments and between each of the directly energized segments and the adjacent auxiliary conductive segments, the auxiliary conductive segments being disposed in pairs relative to each of the directly conductive segments with one of the auxiliary conductive segments being disposed on one side of the adjacent directly conductive segment and with the other auxiliary conductive segment being disposed on the other side of the adjacent directly conductive segment, a plurality of brushes each disposed to provide a coupled relationship with the conductive segments in a different one of the rows, means including the brush coupled to the row of least significance for energizing auxiliary conductive segments on one side of adjacent directly conductive segments upon a coupled relationship between a conductive segment in the row of least ordinal significance and the associated brush and for energizing auxiliary conductive segments on the other side of the adjacent directly conductive segments upon a lack of a coupled relationship between any conductive segment in the row of least ordinal significance and the associated brush, and a plurality of auxiliary conductive segments disposed in additional rows and a plurality of brushes each disposed to provide a coupling with the conductive segments in a different one of the additional rows, the conductive segments in the additional rows being coupled to the auxiliary conductive segments in the rows including the directly conductive segments to control the energizing of the auxiliary conductive segments in these latter rows and the energizing of the brushes associated with these rows.

References Cited in the file of this patent

UNITED STATES PATENTS

| | | |
|---|---|---|
| 2,792,545 | Kamm | May 14, 1957 |
| 2,880,410 | Postman | Mar. 31, 1959 |

OTHER REFERENCES

Klein et al.: Analog-to-Digital Conversion, publication, Instruments and Automation, vol. 29, Issue 5, pp. 911–917, May 1956, p. 7.